P. B. PARKS & M. G. SINGLETON.
KNOT TYING IMPLEMENT.
APPLICATION FILED OCT. 1, 1909.
1,002,437.
Patented Sept. 5, 1911.
3 SHEETS—SHEET 1.
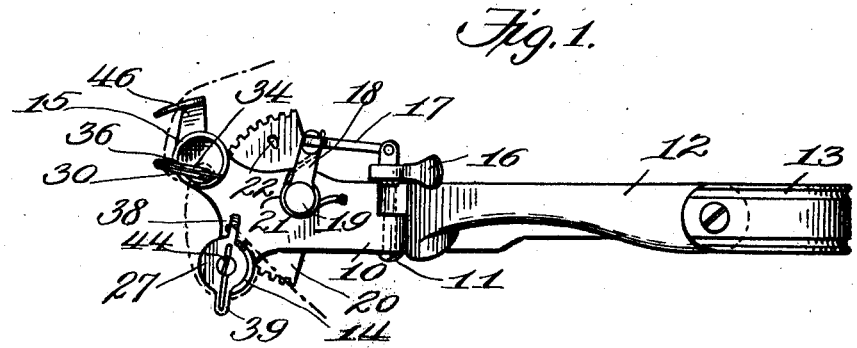
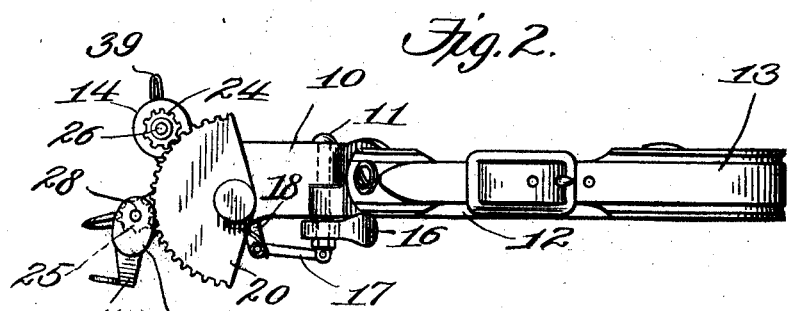
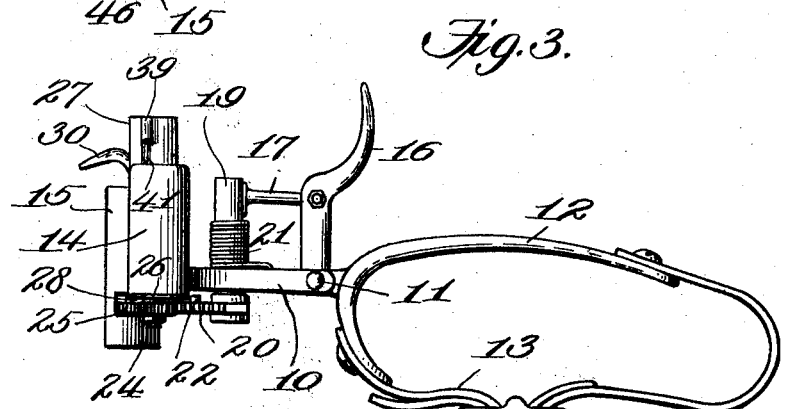
Witnesses
Gerald C. Bartholomew
William Bell
Inventors
Paul B. Parks
Mark G. Singleton

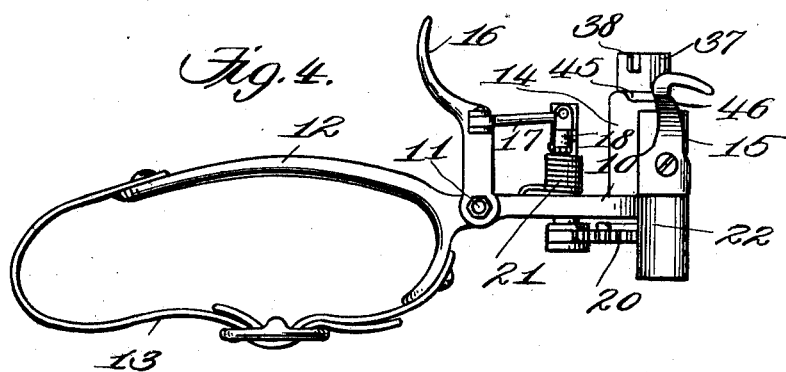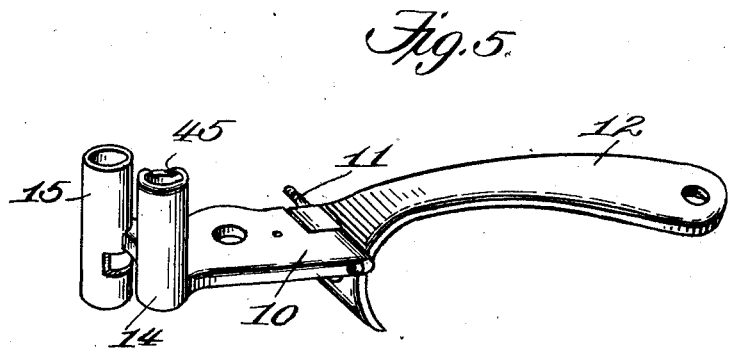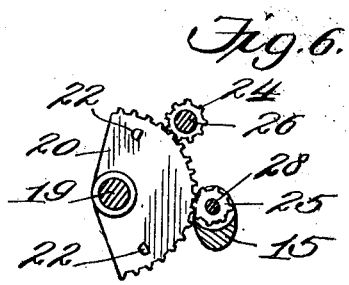

P. B. PARKS & M. G. SINGLETON.
KNOT TYING IMPLEMENT.
APPLICATION FILED OCT. 1, 1909.
1,002,437.
Patented Sept. 5, 1911.
3 SHEETS—SHEET 3.
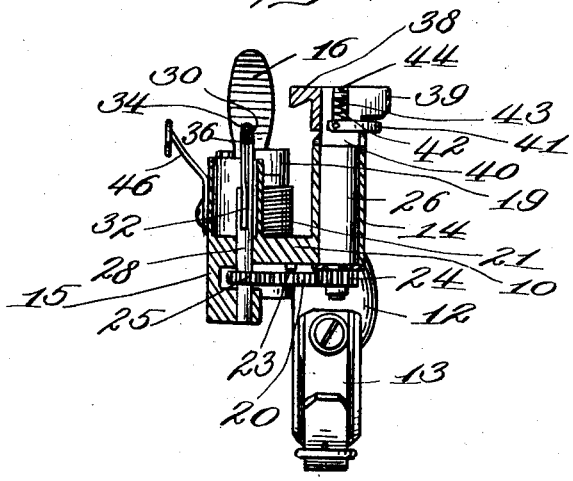
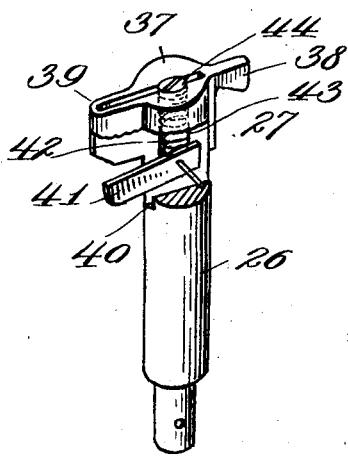
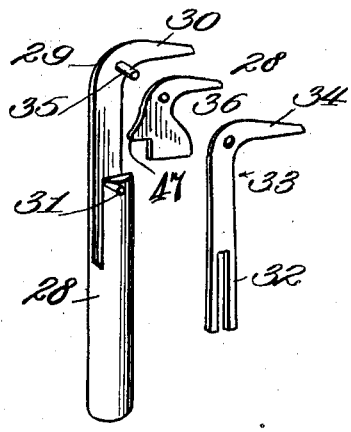
Witnesses:
Gerald C. Bartholomew
William Bell
Inventors
Paul B. Parks
Mark G. Singleton
By
Milo B. Stevens & Co.
Attys

UNITED STATES PATENT OFFICE.

PAUL BLAIR PARKS AND MARK GAMWELL SINGLETON, OF MORGANTON, NORTH CAROLINA.

KNOT-TYING IMPLEMENT.

1,002,437.     Specification of Letters Patent.     Patented Sept. 5, 1911.

Application filed October 1, 1909. Serial No. 520,455.

*To all whom it may concern:*

Be it known that we, PAUL B. PARKS and MARK G. SINGLETON, citizens of the United States, residing at Morganton, in the county of Burke and State of North Carolina, have invented certain new and useful Improvements in Knot-Tying Implements, of which the following is a specification.

Our present invention relates to knot-tying implements of that class which are hand-mounted and operated to mechanically tie a knot in yarns and the like, and our object is to provide an improved implement with respect to simplicity, strength and durability.

The specific objects, and the advantages, of our invention will be apparent to those skilled in the art, from the following description, in which reference is made to the accompanying drawings, forming a part of this specification, and in which, Figure 1 is a top plan view of our improved implement. Fig. 2 is a bottom plan view of the same. Fig. 3 is an elevation of one side thereof. Fig. 4 is a similar view of the opposite side. Fig. 5 is a perspective view of the frame, with all the operating parts removed. Fig. 6 is a horizontal section through the implement on a plane between the frame and the segment gear, looking downward. Fig. 7 is a vertical cross section through the implement on a plane through the tubular bearings of the frame, and the mechanism therein. Fig. 8 is an enlarged detail perspective view of the bill-shaft removed. Fig. 9 is a similar view of the stripping member, partly broken away to show the internal construction of its head, and, Fig. 10 is a view of the knot formed by this machine.

Referring to these drawings, and particularly to Fig. 5, showing the frame, the main central portion 10 is horizontal when the implement is properly held for operation. At its rear end, the frame portion 10 is cut away and provided with a transverse opening for the reception of a laterally projecting stud 11, which extends through an apertured lip upon the forward end of the handle piece 12, and by which said handle piece is connected to said frame in such manner as to permit of the adjustment of the latter with relation to the former. The handle piece 12 carries a strap 13. At the forward end of frame portion 10 are vertical juxtaposed barrels 14 and 15, respectively for the accommodation of the stripping member and bill-shaft. By the foregoing arrangement with respect to the frame parts, the frame may, as shown, be formed in one-piece, thus not only providing increased strength, but doing away with all expense incident to an assemblage of parts and their connections.

Upon the stud 11 is rotatively mounted the lower end of an upwardly projecting finger piece 16, connected, above the frame 10, by a pivotal link 17, to the outstanding arm 18 of the gear shaft 19, which latter is journaled vertically and centrally through said frame 10 and carries upon its lower end, below the frame, a segment gear 20. A torsion spring 21 coiled about the shaft 19, having its lower end anchored in the frame 10 and its upper end engaged by the arm 18, serves to normally hold and return the finger piece 16 forwardly, and tension its rearward movement under actuation of the operator's thumb. The limit of each movement is formed by stop lugs 22 projecting upwardly from the segment gear 20 adjacent opposite edges thereof, and contacting with a pin 23 projecting downwardly from the lower surface of the frame 10. The segment gear 20 meshes with gears 24 and 25 respectively mounted upon the lower ends of the shaft 26 of the stripping member 27, and the bill-shaft 28 within barrels 14 and 15, and thus forming a strong direct transmission between the same.

The bill-shaft 28, shown particularly in Fig. 8, is flattened for about one-half of its length by being cut away, and the end of this flattened portion is bent angularly to form the ordinary knee 29 and bill-head 30. This shaft is also slotted for a distance from its flattened portion and has a transverse pin 31 extending across the mouth of the slot, said slot being for the reception of the longitudinally slotted end 32 of the bill-spring 33, which end 32 straddles the pin 31. The opposite end 34 of the bill-spring 33, is of a shape corresponding to that of the knee 29 and bill-head 30, and is held by a pin 35 projecting laterally from the knee 29 and projecting through an aperture. Thus the bill-spring, by the simple means described, may be effectively held in position. Between the head 30 and spring 33 is a blade 36 through which pin 35 passes to form its fulcrum, the outer end of said blade being of the same shape as the head 30, while its inner end, extending into the barrel 15, is broadened for contact against the inner surface of the barrel whereby it may be properly oscillated upon its said fulcrum to perform its usual function. It should be here stated that the bill-shaft 28, as usual, is eccentrically located within barrel 15.

The stripping member 27, shown particularly in Fig. 9, embodies the shaft 26, journaled through barrel 14, having upon its lower end the gear 24, and centrally bored and slotted at its upper end. Upon the latter end is secured a head 37 having diametrically opposite outstanding wings 38 and 39, and within the slot 40 below said head is pivoted an outstanding clamping piece 41 for movement to and from the wing 39. A spring 42 held within the bore 43 against the piece 41, by a screw 44, closing the end of the bore 43, serves to press the piece 41 away from the wing 39, while the cam shoulder 45 upon the upper end of barrel 14 serves to press said clamping piece against said wing. A yarn guide arm 46 is secured upon the exterior of barrel 15 to guide the yarn so that it may be grasped between the bill-head and the blade 36 when the latter is raised.

In the initial cycle of operations, the yarn or thread is caught by the wing 38 and carried around the stripping member as the bill-head engages it at another point and carries it around to form a loop about the bill-shaft. This completes one single rotation of the bill-shaft, and at the beginning of the next rotation the blade 36 is raised and receives the yarn at another point between it and the bill-head. At the same time the clamping piece 41 has grasped the yarn at a new point against wing 39 and begins to draw the loop off the bill-shaft as blade 36 cuts the yarn behind the loop and the latter holds the end of the yarn next the loop as the continued rotation of the stripping member pulls the knot tight and at last pulls the yarn free from the bill-head. Thus when the finger piece 16 is released and the parts assume their normal position the yarn is entirely released, as, during the reverse movement, the piece 41 is lowered away from the wing 39.

It will be noted that the blade 36 has a sloping projection 47 upon its lower outer edge which, when the upper end lowers to make the cut, is thrown upwardly and thus forces the previously made loop up over the knee 29.

We claim:

1. In a knot tying implement, the combination of a bill-shaft, a stripping member, a shaft carrying said member, said shaft extending parallel to the bill-shaft, pinions on both of said shafts, a single gear in mesh with both of said pinions, and actuating means for the single gear.

2. In a knot tying implement, a bill-shaft, a rotary stripping member having outstanding wings, and a clamping piece carried by said member, and movable in the direction of the length thereof toward and away from one of the wings.

3. In a knot tying implement, the combination with a supporting frame having parallel tubular portions, a bill-shaft rotatably mounted in one of said tubular portions, a shaft rotatably mounted in the other tubular portion, a stripping member carried by the last-mentioned shaft, pinions on both of said shafts, a gear in mesh with both of the said pinions, and means to actuate said gear.

4. In a knot tying implement, a supporting frame, a stripping member mounted thereon, a one-piece bill-shaft carried by said frame and having a portion thereof cut away and a slot extending inwardly therein from said cut out portion, a pivoted blade and a bill spring mounted in said cut out portion, the latter having a portion interlocked within said slot, means for opening and closing the blade, and means to actuate said bill-shaft.

5. In a knot tying implement, a supporting frame, a stripping member mounted thereon, a bill-shaft carried by said frame and having a longitudinally extending slot, a pivoted blade and a bill spring mounted in connection with said bill-shaft, the latter having a portion thereof interlocked within said shaft slot to confine the former, means for opening and closing the blade, and means to actuate said bill-shaft.

6. In a knot tying implement, a supporting frame, a stripping member mounted thereon, a bill-shaft mounted in said frame and provided with a longitudinal slot and with a transverse pin extending across said slot, a pivoted blade and a bill-spring mounted in connection with said shaft, the latter having one end longitudinally slotted to extend within the shaft slot and straddle the transverse pin, means for opening and closing the blade, and means to actuate the bill-shaft.

7. In a knot tying implement, a supporting frame, a stripping member mounted thereon, a bill-shaft mounted on said frame and having its upper end curved to form a knee, means to actuate the bill-shaft, a pivoted bill-blade mounted upon the upper portion of the bill-shaft and having its rear edge, adjacent to the knee, formed with a projection to force the thread loop over the knee, and means for opening and closing the bill-blade.

8. In a knot tying implement, a supporting frame, a bill-shaft mounted thereon, a stripping member mounted upon said frame and comprising a shaft having a threaded bore and a transverse slot at one end, a head upon said end having diametrically opposite outstanding wings, a clamping piece pivoted in said slot and extending outwardly adjacent one of said wings, a spring bearing against said clamping piece, and a screw engaging with the bore and bearing against said spring, and means to actuate said member.

9. In a knot tying implement, a supporting frame, a stripping member mounted thereon, a bill-shaft mounted upon said frame, and having one end partially cut away and provided with an angular head having a transversely projecting pin, a blade fulcrumed upon said pin, said bill-shaft having also a longitudinal slot and a transverse pin extending across said slot, a bill-spring having an aperture adjacent one end to receive the head pin, and having its opposite end slotted to extend within the shaft slot and straddle the transverse pin therein, means to actuate said bill-shaft, means for opening and closing the blade.

In testimony whereof we affix our signatures, in presence of two witnesses.

PAUL BLAIR PARKS.
MARK GAMWELL SINGLETON.

Witnesses:
J. E. ERWIN,
W. E. WALTON.

---

Copies of this patent may be obtained for five cents each, by addressing the "Commissioner of Patents, Washington, D. C."